United States Patent

Oddou et al.

[11] Patent Number: 5,524,064
[45] Date of Patent: Jun. 4, 1996

[54] DEVICE FOR CODING STILL IMAGES

[75] Inventors: Christophe Oddou, Ablon sur Seine; Jacques Sirat, Versailles, both of France

[73] Assignee: U.S. Philips Corporation, New York, N.Y.

[21] Appl. No.: 388,118

[22] Filed: Feb. 13, 1995

Related U.S. Application Data

[63] Continuation of Ser. No. 111,682, Aug. 25, 1993, abandoned.

[30] Foreign Application Priority Data

Sep. 9, 1992 [FR] France .................... 92 10757

[51] Int. Cl.⁶ .................................................. G06K 9/46
[52] U.S. Cl. ................. 382/180; 382/197; 382/204; 382/242
[58] Field of Search ........................... 382/180, 197, 382/204, 292

[56] References Cited

U.S. PATENT DOCUMENTS

| | | | |
|---|---|---|---|
| 4,189,711 | 2/1980 | Frank | 382/26 |
| 4,361,830 | 11/1982 | Honma et al. | 382/22 |
| 4,624,013 | 11/1986 | Urushibata | 382/9 |
| 4,718,101 | 1/1988 | Ariga et al. | 382/9 |
| 4,975,853 | 12/1990 | Shimizu et al. | 382/22 |
| 5,065,439 | 11/1991 | Takasaki et al. | 382/25 |
| 5,073,953 | 12/1991 | Westdijk | 382/9 |
| 5,212,739 | 5/1993 | Johnson | 382/9 |

OTHER PUBLICATIONS

Kunt et al., "Recent Results In High–Compression Image Coding", IEEE Transactions on Circuits and Systems, vol. CAS–34, No. 11, Nov. 1987, pp. 1306–1336.

*Primary Examiner*—Leo Boudreau
*Assistant Examiner*—Christopher S. Kelley
*Attorney, Agent, or Firm*—David R. Treacy

[57] ABSTRACT

A device for coding still images has a device for segmenting the images into homogeneous regions whereto a specific label is attached, and a device for coding the contents of the contour. The contour coding device has a sub-assembly which detects contours for each regions, for each region successively considered, it detects points which are to form a series of control points and transforming the part of the contour joining two successive control points into a straight segment. Then the validity criterion is verified. If the criterion is not met, at least one supplementary control point is introduced between the two control points and so on until it is. The transformation is applied until the contour loop is completely closed.

14 Claims, 4 Drawing Sheets

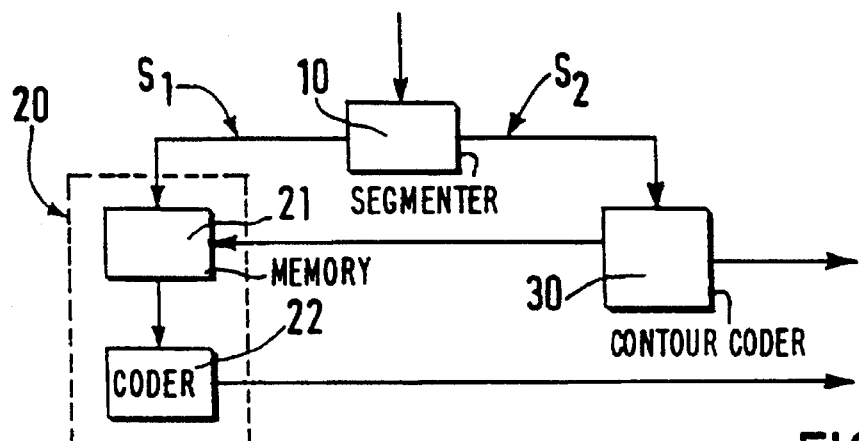
FIG.1
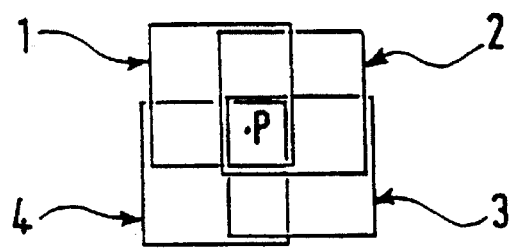
FIG.3
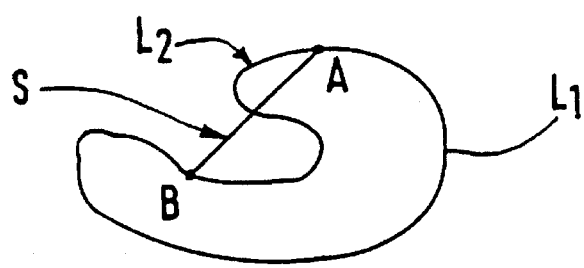
FIG.4
FIG.5

DEVICE FOR CODING STILL IMAGES

This is a continuation of application Ser. No. 08/111,682, filed Aug. 25, 1993 now abandoned.

FIELD OF THE INVENTION

The invention relates to a device for coding still images, comprising means for segmenting said images into homogeneous regions whereto a specific label is attached, and means for coding the contents and the contour of said regions. Such a device can be used notably in the field of transmission and/or storage of still images, for example in applications involving a "Minitel" or similar device.

CROSS-REFERENCE TO RELATED APPLICATION

This application is related to patent application Ser. No. 08/122,870, filed Sep. 16, 1993 now U.S. Pat. No. 5,459,513 by one of the inventors herein.

BACKGROUND OF THE INVENTION

The past decade novel coding techniques have appeared for the coding of still images, inter alia techniques based on the principle of segmentation of an image into a set of regions while preserving, however, the contours corresponding to the objects present within the image. The article "Recent results in high-compression image coding", by M. Kunt, M. Bénard and R. Leonardi, published in IEEE Transactions on Circuits and Systems, Vol. CAS-34, No. 11, November 1987, pp. 1306–1336, describes the principles for carrying out this technique in its section IV "Adaptive split-and-merge".

Generally speaking, the technique for coding an image by segmentation consists in determining, according to given criteria, regions within the image that may be considered to be comparatively homogeneous (that is to say with small or zero variation of the brightness) and searching for a symbolic representation of the regions thus determined, while preserving the information relating to the contours of said regions. Generally speaking, this symbolic representation is obtained by searching for at least an approximation of characteristics which are specific of each of these regions, and coding with a rather high compression ratio can then be achieved by applying the coding procedure to the symbols thus defined.

More specifically, the actual segmentation obtained by searching for a mathematical or statistical model which correctly translates the spatial variations of the brightness (or grey level) of the image which is realised, for example by means of low-order polynomial functions. In the present case where the regions are comparatively homogeneous, the coding of the information representative of the contents of these regions does not pose major problems. The shape and the position of each region are defined by their contour which must be coded in a reliable manner. Exact coding of each complete contour is, therefore, the simplest means for reliably transmitting the chain of successive points constituting a contour, for example by supplying the address of a first point of the contour by way of its real coordinates, by deriving therefrom the subsequent points by a sequence of information taken from three possible symbols: turn left, turn right, go straight ahead; this suffices to construct the contour chain.

Unfortunately, even though at present methods are available which seem satisfactory for coding, with data compression, of the texture of image regions or, more generally speaking, their contents, this does not hold for the contours which, since they are more numerous as the regions are more numerous, remain very costly in respect of coding because they represent a major part of the signals to be coded.

SUMMARY OF THE INVENTION

Therefore, it is an object of the invention to propose a device for coding images which enables a substantial compression of data as a result of contour coding with a highly improved efficiency with respect to the prior art.

To this end, the invention relates to a coding device as defined in the preamble which is characterized in that said contour coding means comprise a subassembly for coding contour information which itself comprises:

a) means for detecting contours in the image to be coded, in this case, for example by examination of labels via a given image scan and storage of image points for which a change of label occurs;

b) means for detecting, on the contour of each region successively considered, points referred to as triplets which are situated at the area of contact of three regions and used to form a series of control points of the region considered, c) means for transforming the contour fragment joining two successive control points in the direction in which the contour is followed into a straight segment, provided that at least one topological validity criterion for said transformation is verified, and for coding the polygonal contour formed by the succession of segments thus obtained, at least one supplementary control point being introduced into said series between the two control points concerned when said validity criterion is not verified, and so on until it is, said transformation being applied to each pair of successive control points until the contour loop is complete closed again, after which it is repeated in a similar manner for all regions of each image.

One of the essential aspects of the structure proposed is the replacement of the very derailed local analysis of contours by an analysis based on a modified definition of shapes of regions which does not change the number of the regions which does not change the number of the regions. More specifically, the contours of regions initially defined by the segmentation are replaced by shapes which are polygonal and hence simpler but which also constitute excellent approximations thereof, provided that given criteria are satisfied.

BRIEF DESCRIPTION OF THE DRAWINGS

The particularities and advantages of the invention will become apparent from the following description and the accompanying drawings, given by way of non-limitative examples, in which:

FIG. 1 shows an embodiment of a coding device in accordance with the invention;

FIGS. 3 and 4 illustrate the method of defining, on the contours of a region, control points which are to remain invariable during the operation performed on the images, FIG. 3 showing the four possible neighbours of a pixel and FIG. 4 showing examples of such control points;

FIG. 5 illustrates the transformation performed on the contours of regions in accordance with the invention.

DESCRIPTION OF PREFERRED EMBODIMENTS

Figure 2:
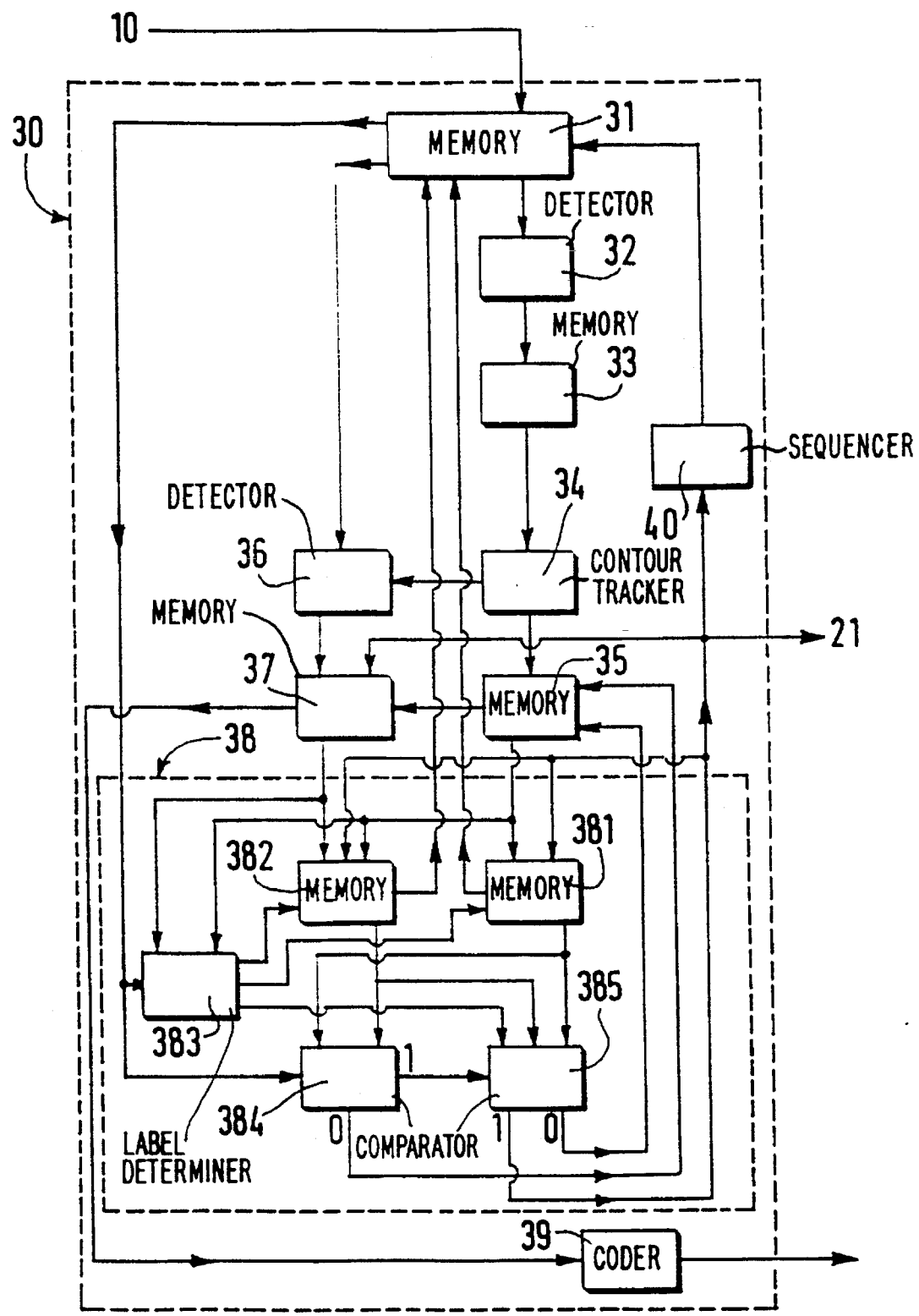
FIG. 2 shows an embodiment of a sub-assembly for coding contour information which is included in the device shown in FIG. 1.

The specific embodiment of the image coding device shown in FIG. 1 comprises first of all a segmentation sub-assembly 10 which serves to subdivide the images into homogeneous regions, that is to say regions which exhibit a brightness variation which is small or zero and can be modelled by polynomial approximation. The segmentation is in this case realised by way of a method which is referred to as a split-and-merge method as described, for example in the cited document (page 1322 and further) and which, therefore, will not be described in detail herein. It is merely to be noted that according to this method the image is first divided into squares and that for each square the polynomial is searched which best describes the grey level variations in this square according to a given first criterion (for example, by applying the least-squares method). If the approximation error between this polynomial and the relevant original square exceeds a given threshold, the square is divided into four new squares which are again subjected to the same method, and so on as many times as necessary. By applying a second criterion for comparing adjacent regions, for example based on the greatest or smallest similarity between the two regions concerned, adjacent regions satisfying this criterion are then merged, which reduction of the number of regions is continued, if necessary, until a final number of regions of given value is obtained.

Thus, by application of this method the sub-assembly 10 makes available on first and second outputs $S_1$ and $S_2$ on the one hand a set of polynomial coefficients expressing the contents of regions produced by segmentation, and on the other hand a set of labels defining the assignment of pixels to a specific region (and hence equivalent to contour information). The first output $S_1$, supplying the polynomial coefficients, is connected to a sub-assembly 20 for coding texture information of each region, the second output $S_2$, supplying the labels, being connected to a sub-assembly 30 for coding contour information.

The sub-assembly 20, shown directly in FIG. 1, comprises a series connection of a memory 21 for storing polynomial coefficients and a circuit 22 for coding coefficients thus stored. The actual execution of coding is controlled, as will be described hereinafter, by the sub-assembly 30. This coding of polynomial coefficients is performed in known manner, for example, by 8-bit coding of each polynomial expression. If the polynomials to be coded are of the type $z=a+bx+cy$, for definition of the plane representative of this expression it suffices to know three non-collinear points in this plane whose amplitudes are denoted as $z_1$, $z_2$, $z_3$ and to code these values $z_1$, $z_2$, $z_3$, or to code one value thereof, for example $z_1$, in an absolute sense and to code the other two values not by coding $z_2$ and $z_3$ but by coding the differences $z_2-z_1$, it being understood that these alternatives do not restrict the invention, in any way.

The sub-assembly 30, a specific embodiment of which is shown in greater detail in FIG. 2, comprises first of all a memory 31 for storing labels. This memory 31 is followed by a circuit 32 for contour detection which, utilizing an arbitrary scan, for example one line after the other or one column after the other, successively examines all labels and detects a contour when it detects a change of label (as has already been stated, a distinct label corresponds to each region). An image memory 33, connected to the output of the circuit 32, provides storage of the contours thus detected, for example by adjusting the pixels situated on the contour and those situated mainly to the sides of the contour to the maximum and the minimum brightness level, respectively, after which a contour tracking circuit 34 fetches from the memory 33, and successively reconstructs the contour of each current region to be processed, in order to store it in a memory 35 in the form of the chain of coordinates of the pixels concerned.

The memory 31 is also followed by a series connection of a circuit 36 for detecting triplets and a memory 37 for storing these triplets which are referred to as control points. As has already been stated, it is desirable to substitute simpler polygonal shapes for the original contours of the regions. On these contours as well as on said polygonal shapes the triplets are the essential marking points corresponding to the points of contact of at least three regions; therefore these points may not be modified. The transformation, if any, of the original contour into a simpler polygonal shape is performed, if justified as will be described hereinafter, only on the contour chain linking two triplets, without influencing the latter in any way.

The detection of these triplets is performed one region after the other as follows. For each point P of the stored contour of the current region, as indicated in FIG. 3 each of the four possible neighbours 1 to 4 is examined. If one of these sets of neighbours contains three distinct labels, the point P for that set is considered to be a triplet associated with the chain of essential control points. This triplet is stored in the memory 37, except when the latter already contains a neighbouring triplet characterized by the same neighbourhood. FIG. 4, showing the labels of an image part, illustrates an example in which this situation occurs. In the region whereto the label 2 corresponds, the point 2 enclosed by a circle in the square at the top left corresponds to a simple triplet. However, in the lower square two neighbouring points 2 could be called triplets, but only one thereof, for example the first point encountered in the scanning direction, is stored in the memory 37, the other one being redundant.

When all triplets of the contour of the current region have been detected and stored, a transformation is performed on one of the two contour sub-chains joining two successive control points, that is to say successively for all pairs of control points taken two by two. For a given pair of control points A and B (see FIG. 5), the entire contour chain is formed by two sub-chains $L_1$ and $L_2$, the sub-chain $L_1$ being left as it is whereas the sub-chain $L_2$ is replaced by a line segment S.

Figure 6:
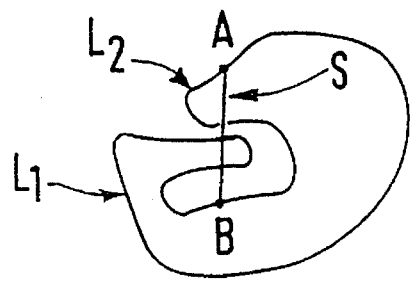
FIGS. 6 to 9 show various specific situations for which said transformation is not acceptable and cannot be validated.
Figure 7:
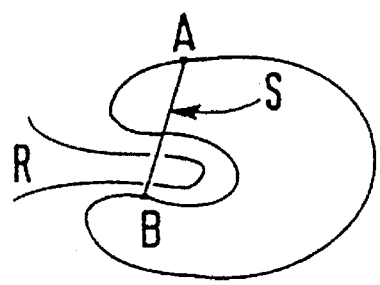
Figure 8:
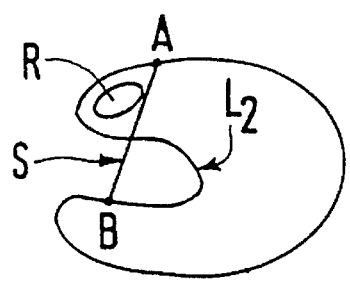
Figure 9:
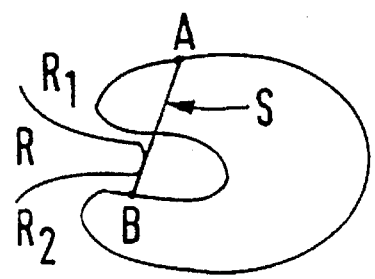

The transformation thus performed, however, is valid, and hence validated, only if given topological restrictions, illustrated by way of the FIGS. 6 to 9, are satisfied. Actually, it is necessary to verify that:

the segment S replacing the sub-chain $L_2$ does not intersect the sub-chain $L_1$ (situation shown in FIG. 6);

another region R is not traversed by the substitute segment S (situation shown in FIG. 7);

substitution of S for $L_2$ does not eliminate another region R included in the current region (situation shown in FIG. 8);

the segment S formed is not tangent to a region R by constricting another region which, consequently, is artificially cut into two distinct regions $R_1$ and $R_2$ (situation shown in FIG. 9).

Figure 10:
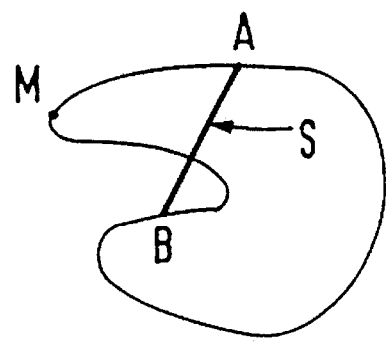
FIGS. 10 and 11 illustrate the situation where, the transformation not being acceptable, the segment S which would be produced by this transformation must be replaced by two segments S' and S" utilizing a supplementary control point M.
Figure 11:
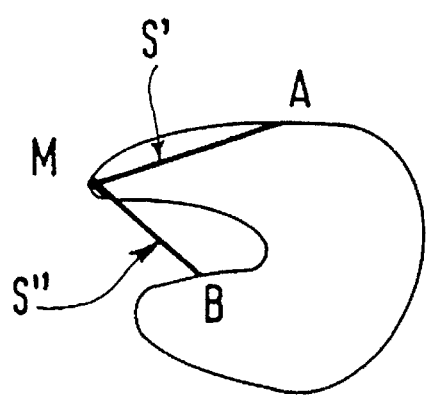

When one of the situations thus defined is encountered, the new configuration is not acceptable because a label (region) is cancelled or added, and the transformation may not be performed in this way. The original segmentation must be kept invariant; that is, the number of regions must remain unchanged. It is actually necessary to create a supplementary control point (see FIG. 10) between the two control points concerned, which supplementary control point is preferably the point M of the original contour which is situated furthest from the non-acceptable segment S, or a neighbouring point, after which A and M are joined, as well as B and M, in order to form two new segments S' and S" (see FIG. 11). The verification whether the above topological restrictions are satisfied is then successively repeated for the two new segments S' and S" thus formed.

The various tests in respect of the validity of the transformation of each contour sub-chain joining two control points into segments are performed in a test stage 38 which is shown in FIG. 2. This stage comprises first of all two memories 381 and 382 for storing labels before transformation (the memory 381 thus contains the information concerning the shape of the region before the transformation into segments) and labels after transformation (the memory 382 thus contains the information concerning the shape of the region after said transformation). The memory 381 receives the output signal of the memory 35, and the memory 382 receives the output signals of the memories 35 and 37. The respective output signals of these memories 381 and 382 are applied to the memory 31 for storing labels in order to update these labels after each transformation.

The stage 38 also comprises a circuit 383 for determining labels corresponding to the regions adjoining the current region, which circuit 383 is connected to the memories 31, 35 and 37. A comparison circuit 384 which receives the output signals of the memories 31, 381 and 382 enables verification whether the topological restrictions cited above are satisfied. If this is not the case, it is necessary to introduce a new control point between the two relevant control points and to repeat the same tests. The logic output signal (0) of the circuit 384 in that case controls the transfer of a supplementary control point (taken on the original contour as indicated above with reference to FIGS. 10 and 11) from the memory 35 to the memory 37.

Figure 12:
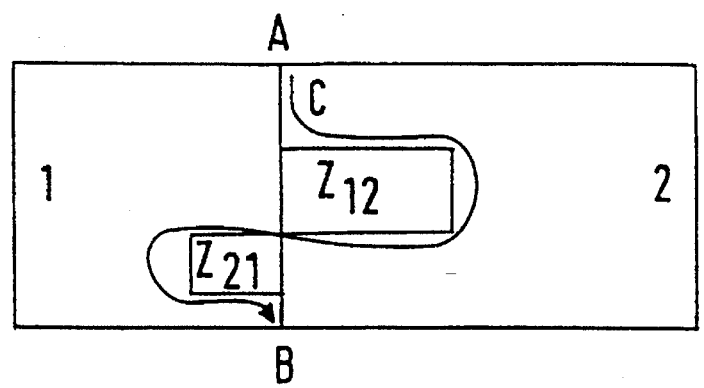
FIG. 12 illustrates the consequences of said transformation for the pixels which consequently change their region of assignment.

However, if said topological restrictions are verified, the logic output signal of the circuit 384 is 1 and a calculation and comparison circuit 385, receiving the output signals of the memories 381 and 382 and that of the circuit 383 and being controlled by said logic output signal 1, starts to evaluate the approximation error resulting from the transformation. As appears from FIG. 12, diagrammatically showing the replacement of the contour between the regions 1 and 2 (this contour C is that in the Figure which follows the movement of the arrow) by the segment joining the two control points A and B, the labels have changed their value in the zones referenced $z_{12}$ and $z_{21}$ which change their region. The error is, for example evaluated by means of the following formula:

$$e = \sum_{z_{21}} (p_1(i,j) - I(i,j))^2 + \sum_{z_{12}} (p_2(i,j) - I(i,j))^2$$

in which:

I(i,j) denotes the original brightness of the pixel (i,j) considered, in the zone $z_{21}$ or $z_{12}$ as the case may be;

$p_1(i,j)$ and $p_2(i,j)$ denote the value taken by the polynomial of the relevant region for the relevant pixel in its new region of assignment.

If this error exceeds a predetermined threshold (output 0 of the circuit 385), the deformation of the image is considered to be inacceptable and, as before, under the control of said output signal 0 it is necessary to introduce a new control point between the two control points concerned. The described procedure is then repeated, including the tests performed by the comparison circuit 384. However, if the error does not exceed said threshold, the transformation into a segment of the part of the original contour situated between the two control points is accepted (output signal 1 of the circuit 385) and under the control of said output signal (which also instructs the memories 381 and 382 to update the memory 31) it is necessary to proceed to the next control point of the chain of control points stored in the memory 37 and to determine whether the part of the contour situated between this next control point and the preceding control point can itself be transformed into a segment. The described procedure is then completely repeated.

If the contour of the region has been completely described and all possibilities for transforming parts of the contour into segments have been examined (and accepted or rejected as indicated above) and the first two control points have been reached again, the output 1 of the circuit 385 no longer controls the passage to a next control point but, under the influence of the circuit 37, applies the output signal of the memory 37 to a circuit 39 for coding the closed polygonal contour then present in said memory. A similar command (shown in the FIGS. 1 and 2) applied to the memory 21 of the sub-assembly 20, then validates in parallel the execution of the coding of polynomial coefficients by the circuit 22, and is subsequently applied also to a sequencing circuit 40 whose output controls the re-initialization of the entire procedure described herein for a new region (and so on until all regions have been dealt with).

As before for the values $z_1$, $z_2$, $z_3$, in the coding circuit 39 the information relating to each control point can be coded either in an absolute sense or in any other way, for example, absolute coding of the information relating to a single one of these points and relative coding (notably on the basis of differences as before, or by means of vectorial components enabling passage from one control point to the next) of the information relating to the other control points.

The output signals of the coding device in accordance with the invention are available on the output of the circuit 22, in the sub-assembly 20, and on the output of the circuit 39 in the sub-assembly 30.

It is to be noted that the present invention is not restricted to the embodiments shown and described above; on the basis of these embodiments alternatives can be proposed without departing from the scope of the invention. Notably when the entire contour of a region has been transformed into a polygonal contour, it may occur that two successive segments of said polygonal contour, thus involving three successive control points, appear as a result of two successive and atonomous segment transformations, and not as a result of the formation of an intermediate control point; it is then necessary to check whether these two segments cannot be replaced by a single segment which links the two extreme points of the three control points concerned, thus eliminating the central control point from the ultimate polygonal contour. For such a test it suffices to reconsider three-by-three all control points of the polygonal contour obtained after a first tracking of the original contour of the region and to subject these points to the described procedure. This re-initialization of the entire procedure can be controlled, as indicated in FIG. 2, by the connection linking the output 1 of the circuit 385 to the memory 37. In this case the same connection will validate the coding performed by the circuits 22 and 39 only after termination of this second test implying the control points three-by-three.

It is to be noted, however, that this second test leads to replacement of two segments by a single segment only in a limited number of cases relative to the number of situations considered during the first test. Actually, so to speak this replacement cannot occur, for the three control points considered, in the situation where the central control point is an intermediate control point voluntarily formed after a non-validated transformation during the first test. It cannot occur either in the situation where both extreme control points of the three points considered are triplets.

We claim:

1. A device for coding still images, comprising means for segmenting said images into homogeneous regions whereto a specific label is attached and detecting contours in the image to be coded, and contour coding means for coding the contents and the respective contour of at least one of said regions, said contour coding means comprising a sub-assembly for coding contour information which itself comprises means for detecting, on the contour of each region successively considered, triplet points which are situated at the area of contact of at least three regions and which serve to form a series of original control points of the regions considered, characterized in that said means for detecting control points comprises, for each contour of the detected region, a circuit for tracking this contour, a memory for storing coordinates of image points successively encountered on this contour, a circuit for detecting said triplet points by comparison of the labels around each point of the stored contour of the current region, and a memory for storing said triplet points which is also connected to the output of the memory for storing the coordinates of the contour of the current region being considered; and said sub-assembly for coding contour information also comprises:

a) means for transforming the contour fragment joining two successive said points in the direction in which the contour is followed into a straight segment;

b) means for testing said straight segment for conformance with at least one topological validity criterion which keeps the number of regions unchanged, said topological validity criterion being exclusive of determination of a distance of a point on said contour fragment from said straight segment;

c) means for introducing at least one supplementary control point into said series between said two successive control points when said validity criterion is not verified, for transforming a contour fragment terminating at the supplementary control point, testing each resulting straight fragments for conformance with said topological validity criterion, and repeating the introducing, transforming and testing until said validity criterion is verified, and then applying the transformation to each pair of successive control points until the contour loop is completely closed again; and d) means for coding the polygonal contour formed by the succession of segments thus obtained.

2. A device for coding still images, comprising means for segmenting said images into homogeneous regions whereto a specific label is attached, and means for coding the contents and the respective contour of at least one of said regions, characterized in that said contour coding means comprise a sub-assembly for coding contour information which itself comprises:

a) means for detecting contours in the image to be coded;

b) means for detecting, on the contour of each region successively considered, points which serve to form a series of original control points of the region considered;

c) means for transforming the contour fragment joining two successive said points in the direction in which the contour is followed into a straight segment;

d) means for testing said straight segment for conformance with topological validity criteria which include:

said straight segment does not intersect the contour being considered at points outside said contour fragment, said straight segment does not intersect another region not adjoining the current region being considered, substitution of said straight segment does not eliminate a different region included in said current region, and said straight segment is not tangent to yet another region thereby constricting yet a different region so as to cut said yet a different region into two distinct regions, and said topological validity criteria being exclusive of determination of a distance of a point on said contour fragment from said straight segment;

e) means for introducing at least one supplementary control point into said series between said two successive control points when said validity criterion is not verified, for transforming a contour fragment terminating at the supplementary control point, testing each resulting straight fragments for conformance with said topological validity criterion, and repeating the introducing, transforming and testing until said validity criterion is verified, and then applying the transformation to each pair of successive control points until the contour loop is completely closed again; and f) means for coding the polygonal contour formed by the succession of segments thus obtained.

3. A device for coding still images, comprising means for segmenting said images into homogeneous regions whereto a specific label is attached, and means for coding the contents and the respective contour of at least one of said regions, characterized in that said contour coding means comprise a sub-assembly for coding contour information which itself comprises:

a) means for detecting contours in the image to be coded;

b) means for detecting, on the contour of each region successively considered, points which serve to form a series of original control points of the region considered;

c) means for transforming the contour fragment joining two successive said points in the direction in which the contour is followed into a straight segment, said means for transforming comprising two label memories for storing labels before and after transformation, respectively, and a circuit for determining labels corresponding to the regions adjoining the current region whose output signal is applied to said label memories;

d) means for testing said straight segment for conformance with at least one topological validity criterion, comprising a comparison circuit for inhibiting transformation in a given number of predetermined geometrical situations;

e) means for introducing at least one supplementary control point into said series between said two successive control points when said validity criterion is not verified, for transforming a contour fragment terminating at the supplementary control point, testing each resulting straight fragments for conformance with said topological validity criterion, and repeating the introducing, transforming and testing until said validity criterion is verified;

f) a calculation and comparison circuit for validating said transformation responsive to the approximation error resulting from this transformation being less than a given error;

g) means for applying the transformation by said means for transforming, testing and introducing to each pair of successive control points until the contour loop is completely closed again; and h) means for coding the polygonal contour formed by the succession of segments thus obtained.

4. A device as claimed in claim 3, wherein said topological validity criterion is exclusive of determination of a distance of a point on said contour fragment from said straight segment.

5. A device as claimed in claim 4, wherein said at least one topological criterion includes:

said straight segment does not intersect the contour being considered at points outside said contour fragment, said straight segment does not intersect another region not adjoining the current region being considered, substitution of said straight segment does not eliminate a different region included in said current region, and said straight segment is not tangent to yet another region thereby constricting yet a different region so as to cut said yet a different region into two distinct regions.

6. A device as claimed in claim 5, further comprising means for controlling re-initialization of the transformation procedure, including the same testing for at least one topological validity criterion, for each set of two successive straight segments which are bounded by original control points.

7. A device as claimed in claim 3, further comprising means for controlling re-initialization of the transformation procedure, including the same testing for at least one topological validity criterion, for each set of two successive straight segments which are bounded by original control points.

8. A device as claimed in claim 7, characterized in that said means for detecting control points comprises, for each contour of the detected region, a circuit for tracking this contour, a memory for storing coordinates of image points successively encountered on this contour, a circuit for detecting on this contour triplet points which are situated at the area of contact of at least three regions, said triplet points forming said original control points, and a memory for storing said triplet points which is also connected to the output of the memory for storing the coordinates of the contour of the current region being considered.

9. A device as claimed in claim 2, further comprising means for repeating the detecting, transforming, testing and introducing in a similar manner for all regions of each image.

10. A device as claimed in claim 9, characterized in that said means for detecting control points comprises, for each contour of the detected region, a circuit for tracking this contour, a memory for storing coordinates of image points successively encountered on this contour, a circuit for detecting on this contour triplet points which are situated at the area of contact of at least three regions, said triplet points forming said original control points, and a memory for storing said triplet points which is also connected to the output of the memory for storing the coordinates of the contour of the current region being considered.

11. A device as claimed in claim 10, further comprising means for controlling re-initialization of the transformation procedure, including the same testing for at least one topological validity criterion, for each set of two successive straight segments which are bounded by original control points.

12. A device as claimed in claim 1, further comprising means for repeating the detecting, transforming, testing and introducing in a similar manner for all regions of each image.

13. A device as claimed in claim 1, further comprising means for controlling re-initialization of the transformation procedure, including the same testing for said at least one topological validity criterion, for each set of two successive straight segments which are bounded by original control points.

14. A device as claimed in claim 2, further comprising means for controlling re-initialization of the transformation procedure, including the same testing for at least one topological validity criterion, for each set of two successive straight segments which are bounded by original control points.

* * * * *